United States Patent [19]

Amrein et al.

[11] Patent Number: 4,916,983
[45] Date of Patent: Apr. 17, 1990

[54] OVERRIDE CONTROL FOR VEHICLE DRIVE TRAIN

[75] Inventors: Bruce E. Amrein, Bel Air, Md.; George Melnik, Newark, Del.; Curtis L. McCoy, Apg, Md.; James A. Martin, Lancaster, Pa.

[73] Assignee: The United States of America as represented by the Secretary of the Army, Washington, D.C.

[21] Appl. No.: 268,827

[22] Filed: Nov. 7, 1988

[51] Int. Cl.$^4$ .............................................. B60K 41/04
[52] U.S. Cl. .................................. 74/878; 74/480 R; 74/483 R
[58] Field of Search ..................... 74/473 R, 477, 479, 74/480 R, 480 B, 483 R, 483 K, 878

[56] References Cited

U.S. PATENT DOCUMENTS

| | | | |
|---|---|---|---|
| 3,382,737 | 5/1968 | Manzolillo | 74/878 |
| 4,119,186 | 10/1978 | Choudhury et al. | 74/483 R X |
| 4,160,499 | 7/1979 | Baba | 74/878 X |
| 4,794,820 | 1/1989 | Floeter | 74/878 |
| 4,801,282 | 1/1989 | Ogawa et al. | 74/480 B X |

Primary Examiner—Dwight G. Diehl
Attorney, Agent, or Firm—Peter A. Taucher; David L. Kuhn

[57] ABSTRACT

The invention is a system to override electric control units which normally governs the transmission and fuel regulating valve of an automotive vehicle. The system includes a first linkage to mechanically operate the automatic transmission, a bypass valve hydraulically in parallel with the fuel regulating valve, and a second linkage to mechanically operate the bypass valve. The linkages are connected to a control assembly in the driver's compartment of the vehicle, the assembly having two moveable members for manually actuating the linkages. The control assembly has a mechanism for keeping the bypass valve closed during selected gears or modes of the transmission. This mechanism also prevents the the transmission from shifting gears when the bypass valve is open.

20 Claims, 6 Drawing Sheets

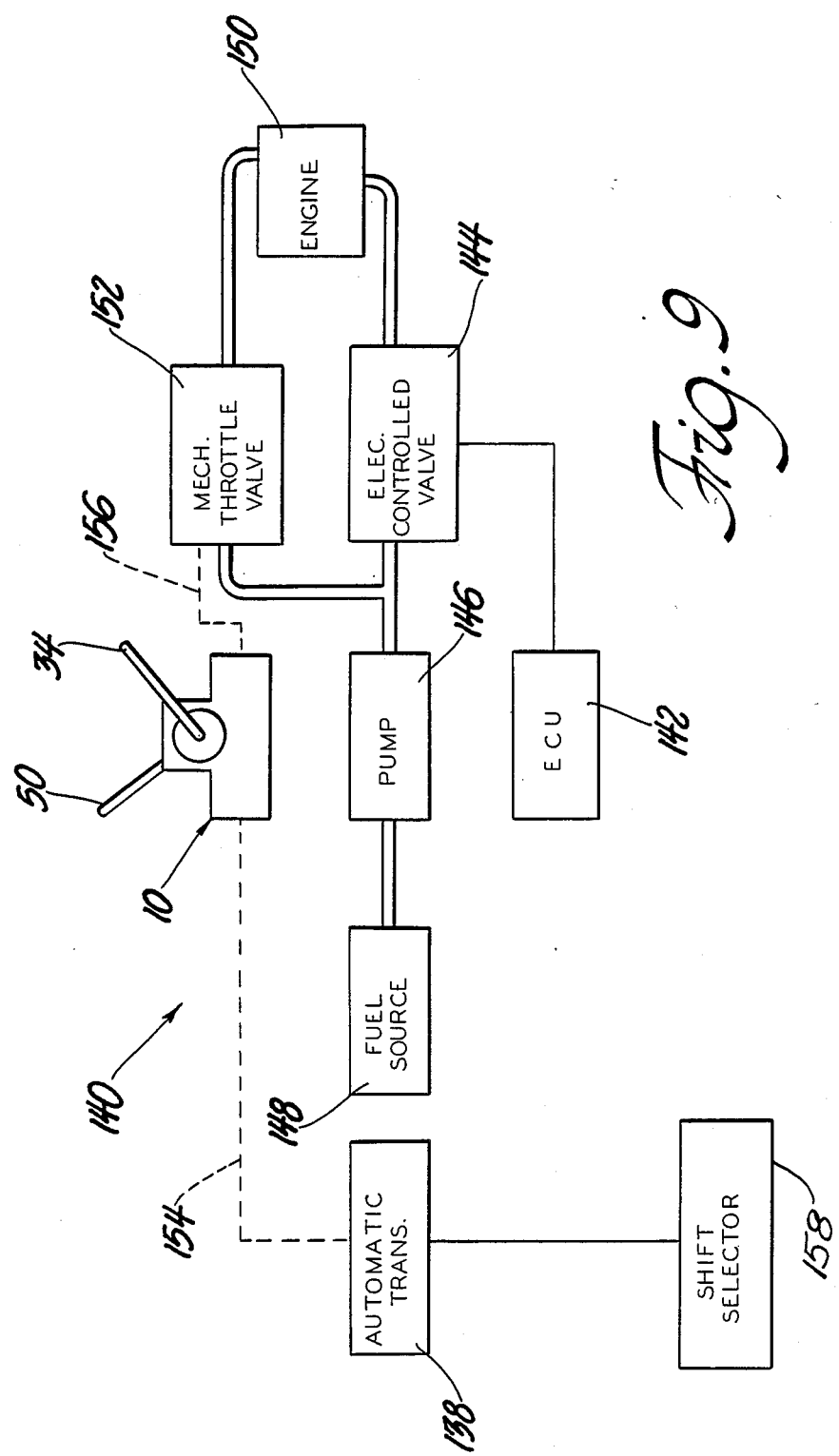

OVERRIDE CONTROL FOR VEHICLE DRIVE TRAIN

BACKGROUND

This invention relates to mechanical override systems to operate vehicle drive trains normally governed by an on-board computer.

In recent years, many vehicle drive trains have been proposed having electronic means to govern the operation of an engine and automatic transmission. One such drive train is that found in an M1 or M1A1 combat tank presently used by the U.S. Army. These tanks have an electronic control unit, commonly called an ECU, which governs the fuel injection system. These tanks also have a transmission shift selector which electrically actuates solenoid valves to regulate an automatic transmission.

The fuel injection system on these tanks is referred to as a hydromechanical unit or HMU, the system being an assembly of electrically actuatable valves and other components. It is contemplated that certain kinds of battle damage to the tank will disable the ECU or HMU. If the HMU experiences a power failure, the HMU reverts to a flow reducing mode during which the engine runs at only 5% of its power capacity and the tank can move at only 1 mph. If the HMU does not receive control signals from the ECU, the HMU will revert to the flow reducing mode. In addition, if the ECU detects certain suboptimal operating conditions in the engine, the ECU signals the HMU to enter the flow reducing configuration. It is also contemplated that electrical communication between the shift selector and the automatic transmission can be interrupted by battle damage or other causes.

In many situations, such as tank crew training exercises, the HMU's entry into the flow reducing mode or failure of the ECU does not pose serious problems. In such situations, limiting fuel flow is a prudent means to reduce the risk of damage to the engine. However, in battle or emergency situations, the need to extricate the tank and its crew from danger supersedes concerns for the engine. To provide tank maneuverability in such situations, we propose an entirely nonelectrical system for overriding the ECU, for manually shifting the automatic transmission, and for bypassing the fuel flow restriction in the HMU.

The override system includes a first linkage which mechanically operates valves regulating the transmission. The system has a second linkage which operates a fuel bypass valve hydraulically in parallel with a flow control valve in the HMU. The linkages are controlled by manually actuated members on a control assembly in the driver's compartment of the tank. The control assembly has a means for preventing the members from being moved independently of one another, so the transmission can not be shifted when the engine is running above a certain speed. The preventing means also keeps the bypass valve from being opened unless the overriding system places the transmission in the drive or reverse mode.

DESCRIPTION OF THE DRAWINGS

FIG. 9 is a schematic diagram of a mechanical override system for controlling the transmission and fuel supply to the engine.

DETAILED DESCRIPTION

Figure 1:
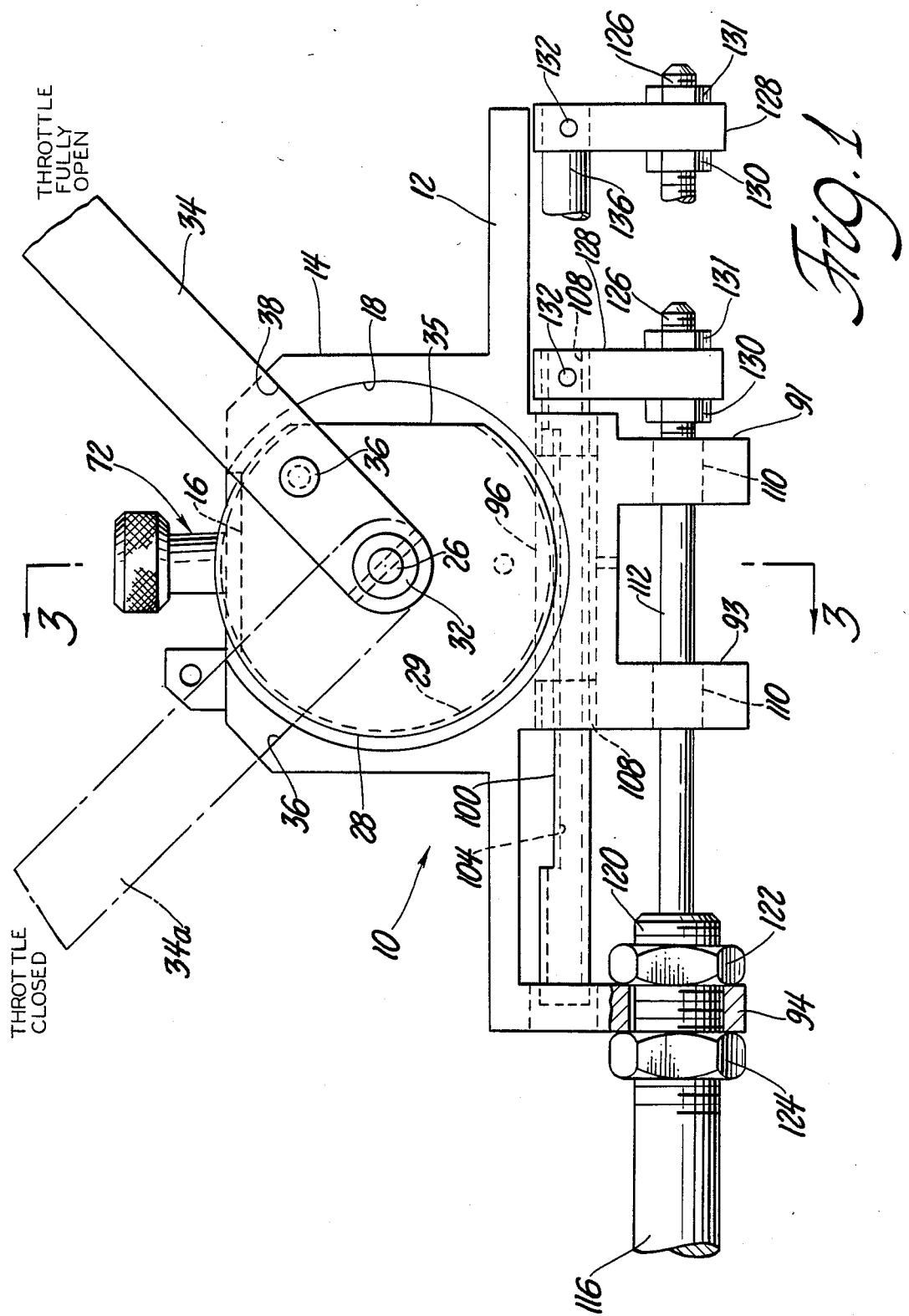
FIG. 1 is an elevational view showing one side of a control assembly for manually controlling the override system.

Referring to FIG. 1, the two-levered control assembly 10 has a platform 12 upon which is integrally formed a mounting block 14 disposed centrally between the ends of the platform 12. Preferably, the control assembly 10 is detachably mounted to the driver's compartment of a vehicle such as an M1 tank currently used by the U.S. Army.

Figure 2:
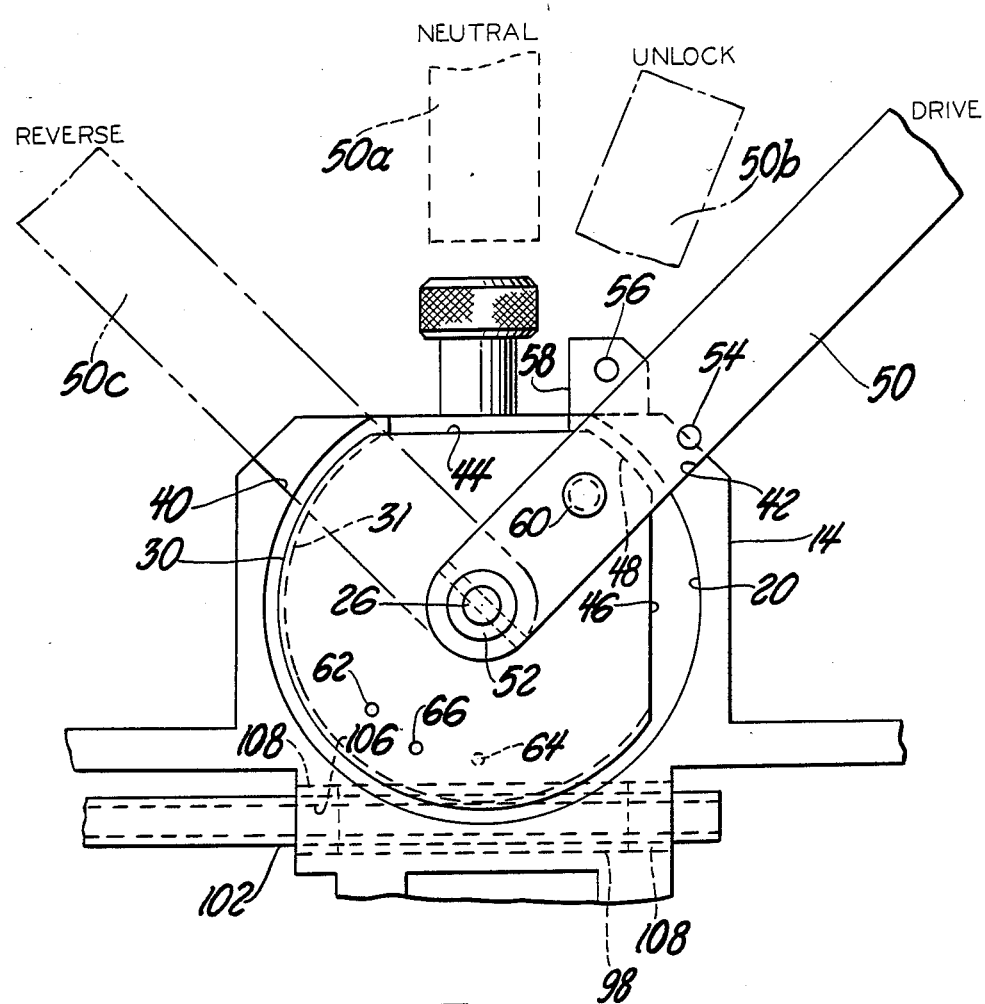
FIG. 2 is a partial elevational view showing the opposite side of the control assembly.
Figure 3:
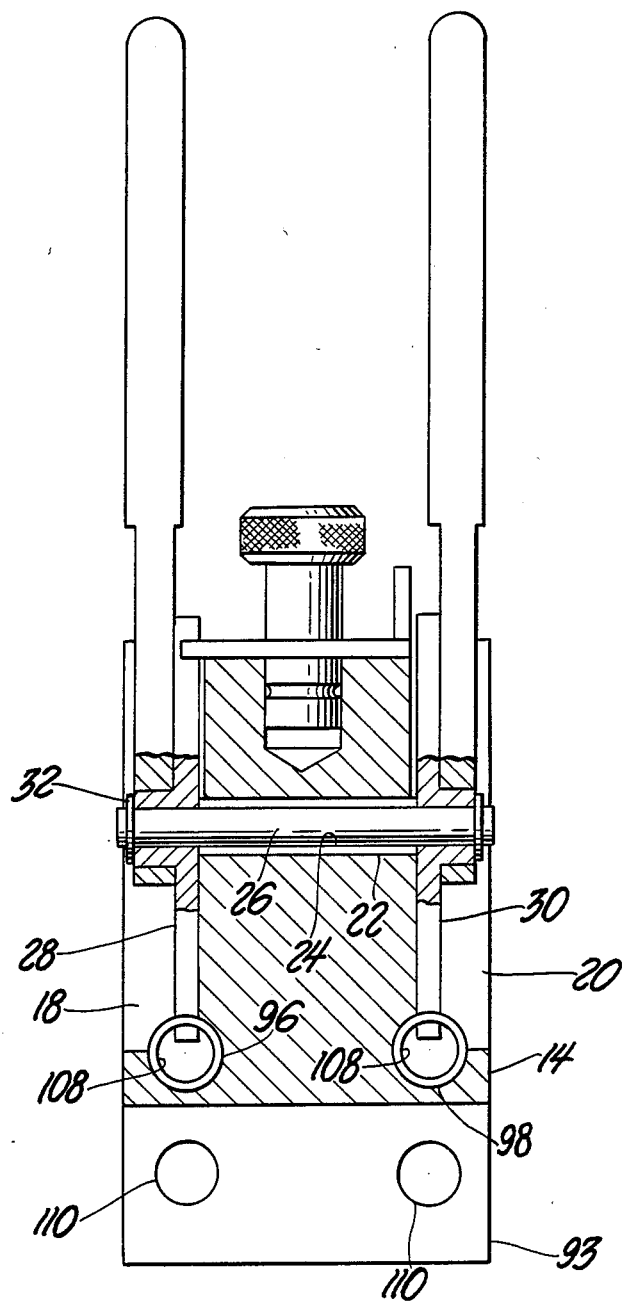
FIG. 3 is a view taken along line 3—3 in FIG. 1, the racks and cables being removed for clarity in the illustration.
Figure 4:
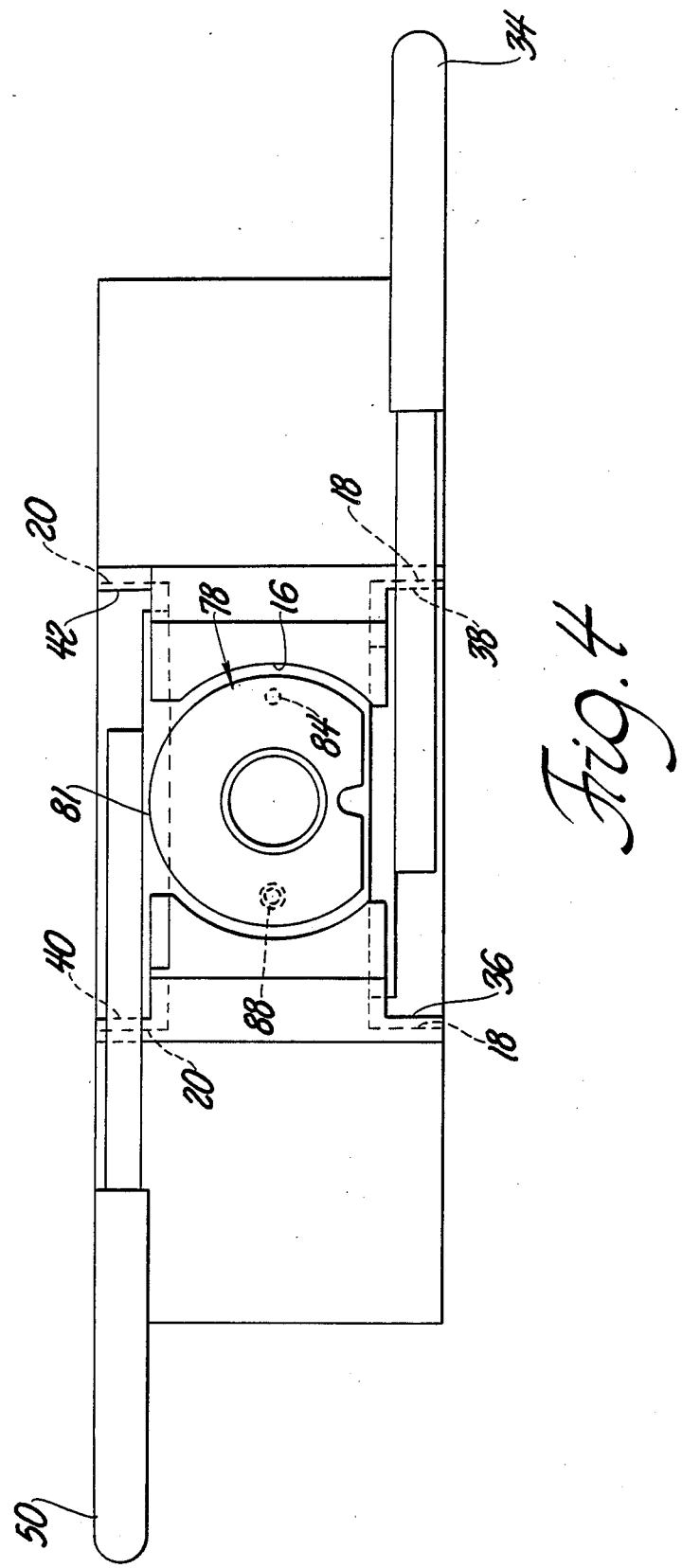
FIG. 4 is a plan view of the control assembly.

Mounting block 12 has shallow recesses 16, 18 and 20, defined on the top and opposing sides of the mounting block, as most easily understood by referring to FIGS. 1, 2 and 4. As best seen in FIG. 3, mounting block 14 has a through aperture 22 connecting recesses 18 and 20, a sleeve 24 lining the aperture, and a fixed shaft 26 pressed through the sleeve and protruding from either side of mounting block 14.

Figure 6:
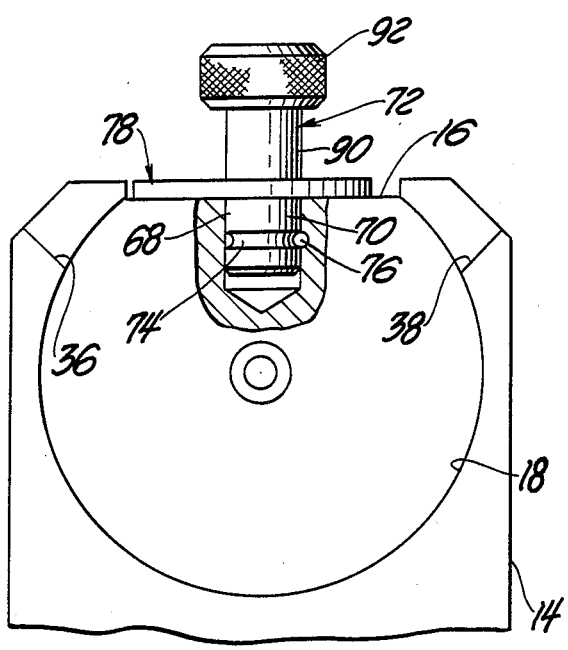

Journaled to either end of sleeve 24 are rotatable plates. These plates are formed as pinion gears 28 and 30, gear 28 being concentrically within recess 18, and gear 30 being concetrically within recess 20. As seen in FIG. 1, gear 28 has teeth represented by dashed line 29 along its approximately 300 degree arcuate peripheral sector and has a chordial flat 35 between the ends of the arcuate peripheral sector. Gear 28 is rotatably retained on shaft 26 by any suitable means such as retaining ring 32. Also rotatable on shaft 26 is speed control lever 34 fixed to gear 28 by screw 36 on a gear radius oriented at a 45 degree angle to chordial flat 35. As best seen in FIGS. 4 and 6, mounting block 14 has two shoulders 36 and 38 at the top of recess 18 which act as stops to limit the angular travel of speed control lever 34.

Speed control lever 34 is movable to a closed throttle position shown at 34a, where little or no fuel is fed to engine 150 (FIG. 9). The position of lever 34 in FIG. 1 is the fully open throttle position, at which a maximum amount of fuel is fed to the engine. Lever 34 is movable to any point between its FIG. 1 position and that shown at 34a, depending on the speed desired by the vehicle operator. In some applications, it may be appropriate to have the closed throttle and fully open positions of lever 34 slightly removed from shoulders 36 and 38, say by five or ten degrees. This will insure that the shoulders will not prevent lever from reaching a fully open or a closed throttle position if wear or slack developes in the linkage connecting lever 34 to a throttle valve 152 (FIG. 9).

Gear 30 is similar to gear 28, but gear 30 has two chordial flats, 44 and 46, which are perpendicular to each other and which have a short arcuate peripheral segment therebetween at 48. Gear 30 has an approximately 200 degree arcuate peripheral sector having teeth represented by dashed line 31. Rotatable with gear 30 on shaft 26 is a transmission control lever 50 retained on shaft 26 by a retaining ring 52 or other suitable means. Disposed along a radius of gear 30 bisecting arcuate segment 48 is a screw 60 fixing transmission control lever 50 to gear 30. Lever 50 can be rotated to align hole 54 therein with a complimentary hole 56 in plate 58 upstanding on mounting block 14.

Diametrically opposed to screw 60 on gear 30 is an aperture 62 which can be engaged by a spring loaded ball plunger mechanism 64 in mounting block 14 when gear 30 is rotated approximately 45 degrees counter-clockwise from its FIG. 2 position. The spring of plunger mechanism 64 normally biases a ball against the obverse face of gear 30 as seen in FIG. 2 and seats the ball into aperture 62 when aperture 62 aligns with plunger mechanism 64. Plunger mechanism 64 provides a slight resistance to movement of aperture 62 out of alignment therewith. About 22.5 degrees counterclockwise from aperture 62 is another aperture 66 similarly engageable by ball plunger mechanism 64. It is not necessary for apertures 62 and 66 to protrude completely through gear 30, and these apertures can be replaced by detents on the obverse side of gear 30.

The FIG. 2 position of transmission control lever 50 corresponds to the "drive" mode of an automatic transmission. The "unlock" position of the control lever is shown at 50b, at which control assembly 10 is completely disengaged from the automatic transmission, thereby allowing another control mechanism (such as the existing shift selector) to operate the transmission. The "reverse" position of lever 50 is shown at 50c and the "neutral" position (at which vehicle accessories can be driven off the engine) is shown at 50a.

Figure 5:
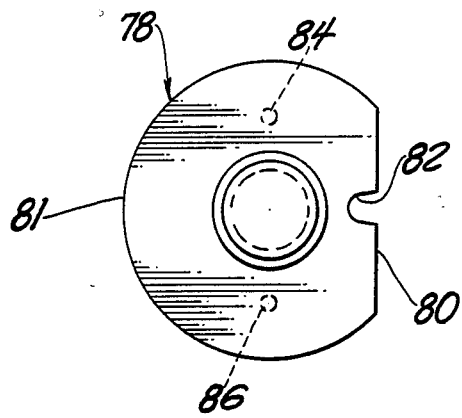
FIGS. 5 and 6 show details of a flanged knob on the control assembly which prevents independent movement of levers on the control assembly.

Referring now to FIG. 6, block 14 defines a bore 68 concentrically within recess 16 on the top of block 14. Fitting closely within bore 68 is one end 70 of a flanged knob 72, end 70 having an annular groove 74 to accommodate a keeper rod 76 extending through block 14. Rod 76 permits knob 72 to be rotated in bore 68 while trapping knob 72 within the bore. Flange 78 on knob 72 a rotatable plate is shaped generally like a disk having one flat edge 80 diametrically opposite an interference edge 81 of the flange, which blocks movement of pinion gears 28, 30 under circumstances to be described later. As can be seen in FIGS. 4 and 5, the arcuate or circular portion of flange 78, which includes interference edge 81, has an angular measurement of 270 degrees. Along radii of flange 78 parallel to flat edge 80 are detents 84 and 86 on the flange's undersurface, which faces toward block 14. Flat edge 80 also has a notch 82 angularly midway between detents 84 and 86. Formed in mounting block 14 directly beneath flange 78 is a ball plunger mechanism 88 (FIG. 4) having a ball biased to seat in detents 84 or 86 or to enter notch 82 when knob 72 is in the appropriate angular position. Ball plunger mechanism 88 is approximately midway between the gear bearing sides of mounting block 14, at the left side of recess 16 as viewed in FIG. 4. Referring to FIG. 6 above flange 78 is stem 90 by which knurled head 92 is connected to knob 72.

Referring again to FIGS. 1, 2, 3 and 7, platform 12 has platelike walls 91 and 93 attached to the base of block 14 and a notched bracket 94 at one end of the platform. Passing through the base of block 14 are two passages 96 and 98 to accommodate racks 100 and 102 respectively, the racks being toothed or threaded as represented by dashed lines 104 and 106. Passages 96 and 98 have bearing collars 108 at either end through which racks 100 and 102 slide. Directly below passages 96 and 98, in walls 91 and 93, are sets of apertures 110 to accommodate push-pull cables such as that shown at 112.

Figure 7:
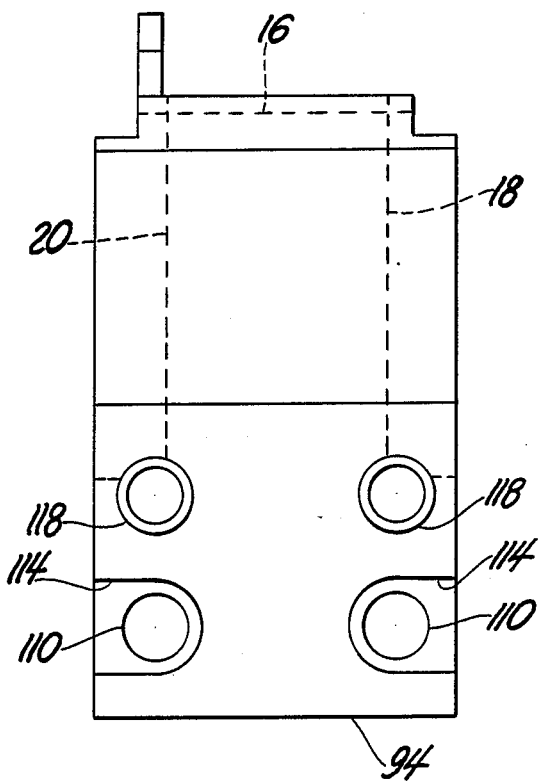
FIG. 7 is an end elevational view of the mounting block of the control assembly.

Referring to FIGS. 1 and 7, bracket 94 defines a pair of notches 114 for accepting threaded portions 120 of cable sheaths 116 and further defines a pair of apertures 118 directly above the notches for accommodating racks 100 and 102. The threaded portions 120 of cable sheaths 116 are retained upon bracket 94 by nuts 122 and 124, which can be used to adjust the axial position of cable sheath 116 relative to platform 12.

Figure 8:
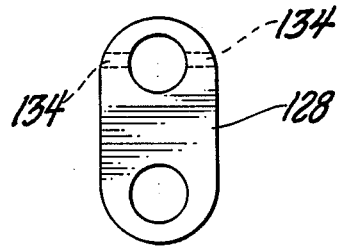
FIG. 8 is a detail view of an oval fastner shown in FIG. 1.

At the threaded ends 126 of cable 112 are oval fasteners 128 (FIG. 8) fixed to the cable ends by nuts 130 and 131 at opposite sides of the oval fasteners. Oval fasteners 128 are also connected to the respective racks 100 and 102 by roll pins 132 extending through ductways 134 in the fasteners and through the terminus 136 of each rack. As can be seen from FIG. 1, cables 112 and the racks are all parallel to one another, but the relative positions of associated cables and racks can be modified by alternately loosening and tightening nuts 130 and 131 to axially reposition fasteners 128 on cable ends 126.

OPERATION OF TWO LEVER CONTROL ASSEMBLY

The operation of control assembly 10 is perhaps best explained by first describing its configuration during the "unlock" mode, wherein assembly 10 is disabled from controlling the vehicle transmission. During the "unlock" mode, transmission control level 50 is at position 50b in FIG. 2, holes 54 and 56 are aligned and a lock pin (not shown) is typically passed through these holes to hold lever 50 in place. The arcuate peripheral segment 48 of gear 30 will be above the top of mounting block 14 and flange 78 has its flat edge 80 faced toward gear 30. The interference edge 81 of flange 78 protrudes over gear 28, which must be in its 34a (closed throttle) position to avoid interference edge 81, so that a vehicle operator can not use assembly 10 to supply fuel to the engine during the "unlock" mode. The angular position of flange 78 (180 degrees away from its FIG. 4 position) is such that ball plunger 88 engages detent 84 in the flange. Also, the angular position of gear 30 is such that aperture 66 is engaged by ball plunger 64. To move flange 78 or gear 30, the restraining force of the respective ball plungers must be overcome.

Assuming that the operator wants to place the transmission in the "drive" mode, he places lever 50 in its FIG. 2 position, whereby flat 44 of gear 30 aligns with the top of block 14. To release speed control lever 34, the operator rotates flange 78 to its FIG. 4 position, where detent 86 of the flange engages ball plunger 88. The operator then moves lever 34 as necessary to obtain the desired vehicle speed. During subsequent operation of the vehicle, if speed control lever 34 is anywhere but its 34a (closed throttle) position, flange 78 is immobilized. Therefore, interference edge 81 of flange 78 keeps gear 30 and control lever 50 in the "drive" (FIG. 2) position. By this arrangement, the vehicle operator is prevented from shifting from "drive" to "neutral or "reverse" during an open throttle condition, thereby safeguarding the engine and transmission from damage. Preferably, some means is provided to insure that the engine is supplied with sufficient fuel to avoid stalling when lever 34 is in the closed throttle position.

If it is desired to move the transmission from the "drive" mode into the "reverse" mode, speed control lever 34 is moved to its 34a position, flange 78 is rotated 180 degrees from its FIG. 4 position, and transmission control lever 50 is moved past its 50a, "neutral" position to the 50c, "reverse" position. As lever 50 moves past the "neutral" position, ball plunger 64 engages detent 62 in gear 30, so that the vehicle operator must exert additional effort to continue moving lever 50 to the 50c position. Flange 78 is rotated 180 degrees once again, so as to bring it back to its FIG. 4 position. Speed control lever 34 can then be used to vary vehicle speed.

PROPULSION SYSTEM INCORPORATING THE CONTROL ASSEMBLY

FIG. 9 is a simplified schematic showing a propulsion system 140 for a vehicle such as a military tank, which incorporates control assembly 10. The system includes an automatic transmission 138 shiftable by a set of solenoid-operated valves (not shown) protruding from the housing of the transmission. The valves are normally controlled by signals from a shift selector switch 158, which responds to demands for vehicle speed and direction initiated by the operator of the vehicle. The ECU (electronic control unit) controls an electrically actuated fuel metering valve 144 having a default position where it passes just enough fuel to idle engine 150 or allow the vehicle to travel at a creep rate of, say 1 mph. ECU 142 moves valve 144 between the default position and a fully open position, where valve 144 provides a predetermined maximum fuel flow to engine 150. Under normal circumstances, pump 146 supplies fuel at constant pressure from fuel source 148 to engine 150 through metering valve 144. Mechanical throttle valve 152 is normally shut. ECU 142 is programmed to move valve 144 to the default position when it receives certain feedback signals from the propulsion system. Also, if the ECU fails to receive electrical power, valve 144 reverts to the default position; transmission 138 stays in the gear or mode it was in at power failure if the engine continues to operate.

Propulsion system 140 includes a mechanical linkage between the valves on transmission 138 and control assembly 10, this linkage being represented by dashed line 154 in FIG. 9. Linkage 154 manipulates the valves on the transmission in response to movement of transmission control lever 50 on control assembly 10. Control assembly 10 is normally in the previously described "unlock" mode wherein linkage 154 is disabled from controlling the valves on transmission 138, thus permitting shift selector switch 158 to control these valves.

Another mechanical linkage 156 between control assembly 10 and throttle valve 152 manipulates this valve in response to movement of speed control lever 34. Lever 34 is normally in the previously described closed throttle position 34a shown at FIG. 2. By means of linkages 154 and 156, control assembly 10 can be used to manually override the ECU or to control transmission 138 and engine 150 if shift selector switch 158 fails to operate.

We wish it to be understood that we do not desire to be limited to the exact details of the construction shown and described since obvious modifications may occur to those skilled in the art without departing from the scope of the following claims.

We claim:

1. a control device of a manual override mechanism for regulating a vehicle transmission and fuel throttle valve normally governed by electronic means, comprising:
   a plurality of rotatable plates, each plate having a remote edge further from the plate rotational axis than a proximal edge;
   a means for mounting the plates wherein a first and second plate are perpendicular to a third plate and wherein the rotational path of the third plate's remote edge intersects the rotational paths of the first and second plates' remote edges, the rotational paths of each proximal edge being removable from the rotational path of all other edges;
   a first manual actuation means for rotating the first plate;
   a second manual actuation means for rotating the second plate;
   a first linkage means for controlling the throttle valve in response to rotation of the first plate;
   a second linkage means for controlling the transmission in response to movement of the second plate.

2. The device of claim 1 wherein the remote edge of the third plate occupies at least a 270 degree sector of the third plate so that the first and second plates can not be moved simultaneously.

3. The device of claim 2 wherein the first plate has a closed throttle position corresponding to a condition of the throttle valve in which little or no fuel flows through the valve and in which the first plate's proximal edge faces the rotational path of the third plate's remote edge.

4. The device of claim 3 where the closed throttle position is the only position of the first plate that does not interfere with rotation of the third plate.

5. The device of claim 2 wherein the second plate has two proximal edges, and wherein the second plate has a plurality of remote edges, at least one of the remote edges being disposed between the second plate's two proximal edges.

6. The device of claim 5 wherein the second plate has drive and reverse rotational positions corresponding to the drive and reverse modes of the automatic transmission, one of the second plate's proximal edges facing the rotational path of the third plate's remote edge during the drive position, and the other of the second plate's proximal edges facing toward the rotational path of the third plate's remote edge during the reverse position.

7. The device of claim 6 wherein the drive and reverse positions of the second plate are the only positions of the second plate that do not interfere with rotation of the third plate.

8. The device of claim 5 wherein the second plate has an unlock rotational position where the control device is disabled from controlling the transmission, a first remote edge of the second plate intersecting the rotational path of the third plate during the unlock position.

9. The device of claim 8 wherein the second plate has a neutral position where the control device retains control of the transmission while the vehicle remains stationary, a second remote edge of the second plate remaining in the rotational path of the third plate during the neutral position.

10. The device of claim 1 wherein the peripheries of the first and second plate each include an arcuate toothed sector for engaging the respective linkage means.

11. The device of claim 10 wherein each linkage means includes a rack translatable in the mounting means engaged with one of the toothed sectors, the first linkage means including a push-pull cable connected between one rack and the throttle valve and the second linkage means including a push-pull cable connected between the other rack and the transmission.

12. The control device of claim 11 further including a calibration means to adjust the axial position of the cables with respect to the racks connected thereto and to adjust the position of sheaths for the cables relative to the mounting means.

13. A control device for a manual override mechanism of a normally electronically controlled propulsion system of a vehicle, comprising:

a mounting block having opposing sides;

a first plate whose movement governs a means for controlling fuel flow in the vehicle, the first plate being asymmetrical with respect to its axis of revolution and being rotatably mounted on one of the opposing sides of the mounting block, the periphery of the first plate defining a first flat closer to the first plate's axis of revolution than the remainder of the first plate's periphery;

a second plate whose movement controls a transmission in the vehicle, the second plate being asymmetrical with respect to its axis of revolution and being rotatably mounted on the other opposing side of the mounting block, the periphery of the second plate defining two second flats closer to the second plate's axis of revolution than the remainder of the second plate's periphery;

a flange rotatably mounted on a third side of the mounting block between the two opposing sides of the mounting block, the periphery of the flange defining an edge closer to the flange axis of rotation than the remainder of the flange periphery;

the flange rotatable to a first position where the remainder of the flange periphery protrudes into the rotational path of the second plate, the flange rotatable to a second position where the edge avoidingly faces the rotational path of the second plate to permit rotation of the second plate, the second plate having a second plate's set of interfering rotational positions where the remainder of the second plate's periphery protrudes into the rotational path of the flange, the second plate having a second plate's set of noninterfering rotational positions where one of the second flats of the second plate faces the rotational path of the flange to permit rotation of the flange;

the first plate having a first plate's set of interfering rotational positions where the remainder of the first plate's periphery protrudes into the rotational path of the flange, the first plate further having one noninterfering rotational position wherein the first flat avoidingly faces the rotational path of the flange to permit rotation of the flange.

14. A control device comprising:

a plurality of rotatable plates, each plate having a remote edge further from the plate rotational axis than a proximal edge;

a means for mounting the plates wherein the rotational path of a first plate's remote edge intersects the rotational paths of second and third plates' remote edges, the rotational paths of each proximal edge on any one plate being removable from the rotational path of all edges on any other plate;

a means for rotating the second plate;

a means for rotating the third plate.

15. The device of claim 14 further comprising:

a first linkage means engaged by the second plate for controlling a throttle valve in response to angular movement of the second plate;

a second linkage means engaged by the third plate for controlling a transmission in response to angular movement of the third plate.

16. The device of claim 15 wherein the remote edge of the first plate occupies a sufficiently large sector of the first plate so that the second and third plates can not be moved simultaneously.

17. The device of claim 16 wherein the second plate has a closed throttle position corresponding to a condition of the throttle valve in which little or no fuel flows through the valve and in which the second plate's proximal edge faces the rotational path of the first plate's remote edge and wherein the closed throttle position is the only position of the second plate that does not interfere with rotation of the remote edge of the first plate.

18. The device of claim 16 wherein the third plate has two proximal edges and wherein the third plate has a plurality of remote edges, at least one of the third plate's remote edges being disposed between the third plate's two proximal edges.

19. The device of claim 18 wherein the third plate has drive and reverse rotational positions corresponding to the drive and reverse modes of the transmission, one of the third plate's proximal edges facing the rotational path of the first plate's remote edge during the drive position, and the other of the third plate's proximal edges facing toward the rotational path of the first plate's remote edge during the reverse position.

20. The device of claim 19 wherein the drive and reverse positions of the third plate are the only positions of the third plate that do not interfere with rotation of the remote edge of the first plate.

* * * * *